(12) United States Patent
Bommarito et al.

(10) Patent No.: US 7,004,841 B2
(45) Date of Patent: Feb. 28, 2006

(54) DRIVESHAFT ASSEMBLY WITH RETENTION MECHANISM

(75) Inventors: Michael J. Bommarito, Portage, MI (US); Steven P. Gillihan, Kalamazoo, MI (US); Joseph P. Flanagan, Portage, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 10/947,490

(22) Filed: Sep. 22, 2004

(65) Prior Publication Data

US 2005/0037850 A1    Feb. 17, 2005

Related U.S. Application Data

(63) Continuation of application No. 10/372,998, filed on Feb. 24, 2003, now Pat. No. 6,821,207.

(51) Int. Cl.
*F16D 3/40* (2006.01)

(52) U.S. Cl. .......................... 464/130; 411/518
(58) Field of Classification Search ........ 464/128–130, 464/111, 127, 132; 411/518, 519; 285/321; 403/372, DIG. 7, 359.5
See application file for complete search history.

(56) References Cited

U.S. PATENT DOCUMENTS

| 1,993,357 | A | * | 3/1935 | Braun et al. ................. 464/130 |
| 2,539,387 | A | * | 1/1951 | Alden ................. 403/359.5 X |
| 3,920,270 | A | * | 11/1975 | Babb, Jr. ................. 285/321 X |
| 4,111,464 | A | * | 9/1978 | Asano et al. ........... 285/321 X |
| 4,224,806 | A | * | 9/1980 | Kobayashi .................. 464/111 |
| 4,813,808 | A | * | 3/1989 | Gehrke ................ 403/359.5 X |
| 5,718,464 | A | * | 2/1998 | Mark .......................... 285/321 |
| 5,725,431 | A | * | 3/1998 | Reynolds .................... 464/128 |
| 6,168,529 | B1 | * | 1/2001 | Moulinet |
| 6,280,335 | B1 | * | 8/2001 | Wehner et al. .............. 464/130 |
| 2003/0224862 | A1 | * | 12/2003 | Schultze .................... 464/127 |

* cited by examiner

*Primary Examiner*—Greg Binda
(74) *Attorney, Agent, or Firm*—Harness, Dickey & Pierce P.L.C.

(57) ABSTRACT

A universal joint includes a yoke with a leg having an aperture extending therethrough. The aperture includes an annular groove. The universal joint also includes a cruciform having a trunnion, a bearing cup positioned in the aperture and mounted on the trunnion and a retention member including a stepped cross-section. The retention member is disposed within the groove to fill the gap remaining between the groove edge and the bearing cup.

14 Claims, 3 Drawing Sheets

DRIVESHAFT ASSEMBLY WITH RETENTION MECHANISM

CROSS-REFERENCE TO RELATED APPLICATIONS

This application is a continuation of U.S. patent application Ser. No. 10/372,998 filed on Feb. 24, 2003, now issued U.S. Pat. No. 6,821,207. The entire disclosure of the above application is incorporated by reference herein.

BACKGROUND OF THE INVENTION

The present invention generally relates to a universal joint for use in a driveline of a motor vehicle. More specifically, the present invention pertains to a universal joint equipped with a retention member for securing a bearing cup in a yoke.

As is commonly known, universal joints are used in motor vehicle driveline applications for interconnecting a pair of rotary shafts and permitting changes in angularity therebetween. Many conventional universal joints include a pair of bifurcated yokes which are secured to the rotary shafts. The bifurcated yokes are interconnected by a spider or a cruciform for rotation about independent axes. The spider includes four orthogonal trunnions with each opposing pair of axially aligned trunnions mounted in a pair of aligned bores formed in the bifurcated yokes. Typically, a bearing cup is secured in each bore and a bearing assembly is retained in the bearing cup such that each yoke is supported for pivotal movement relative to one of the pairs of trunnions.

Various retention methods have been developed for securing the bearing cups to the yokes in a manner wherein the rotary axis of each yoke is aligned centrally with respect to the rotary axis of the spider. Traditional bearing cup retention methods include the use of grooves and planar snap rings. However, this method has one or more disadvantages such as, for example, excessive machining requirements, limited serviceability, and high cost of manufacture. In particular, one type of conventional universal joint utilizes a planar snap ring seated in a circumferential groove machined into the bore formed in the yokes for axially retaining the bearing cups. However, due to the dimensional variation of each component, either an interference condition or an excess clearance between the bearing cup and the snap ring is accumulated. If an interference condition exists, one or both of the bifurcated yokes is mechanically deformed to increase the spacing between the previously machined grooves. If an excess clearance condition exits, a Belleville washer may be disposed between the bearing cup and the snap ring to preload the bearing. Alternatively, an assembler may be provided with a plurality of snap rings having different thicknesses. The assembler uses a trial and error method to fit the largest snap ring possible within the clearance.

Other universal joint retention devices attempt to compensate for the dimensional variation in the components but sacrifice serviceability. Several examples of bearing cup retention arrangements and methods associated with conventional universal joints are disclosed in U.S. Pat. Nos. 3,062,026, 3,178,907 and 4,000,628.

SUMMARY OF THE INVENTION

Accordingly, the present invention is directed to overcoming the disadvantages commonly associated with the manufacture and subsequent service of conventional universal joints. Therefore, it is an object of the present invention to reduce the number of components and cost required to construct an easily serviceable universal joint assembly.

The present invention is directed to a universal joint for interconnecting a pair of rotating shafts. The universal joint includes a yoke with a leg having an aperture extending therethrough. The aperture includes an annular groove. The universal joint also includes a cruciform having a trunnion, a bearing cup positioned in the aperture and mounted on the trunnion and a retention member including a stepped cross-section. The retention member is disposed within the groove to fill the gap remaining between the groove edge and the bearing cup. The stepped cross-section of the retention member at least partially enters the groove and engages the bearing cup.

Further areas of applicability of the present invention will become apparent from the detailed description provided herein after. It should be understood however that the detailed description and specific examples, while indicating preferred embodiments of the invention, are intended for purposes of illustration only since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

In general, the present invention is directed to a universal joint of the type used in motor vehicle driveline applications for interconnecting rotating shafts in a manner permitting changes in angularity therebetween.

Figure 1:
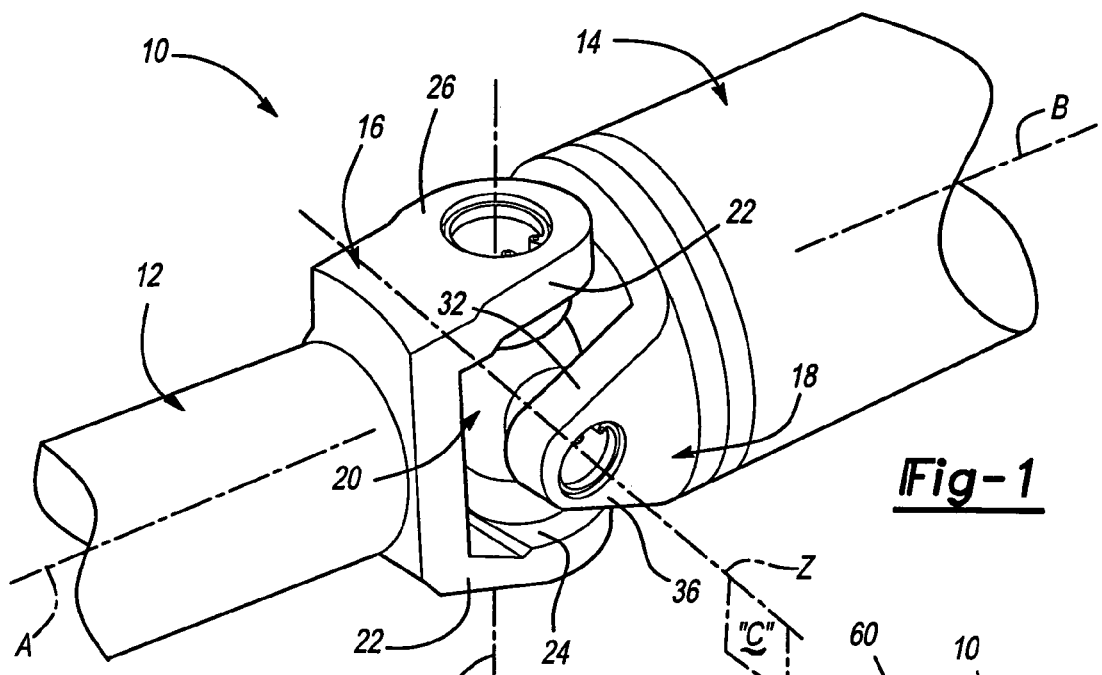
FIG. 1 is a perspective view of a universal joint according to the principals of the present invention.
Figure 2:
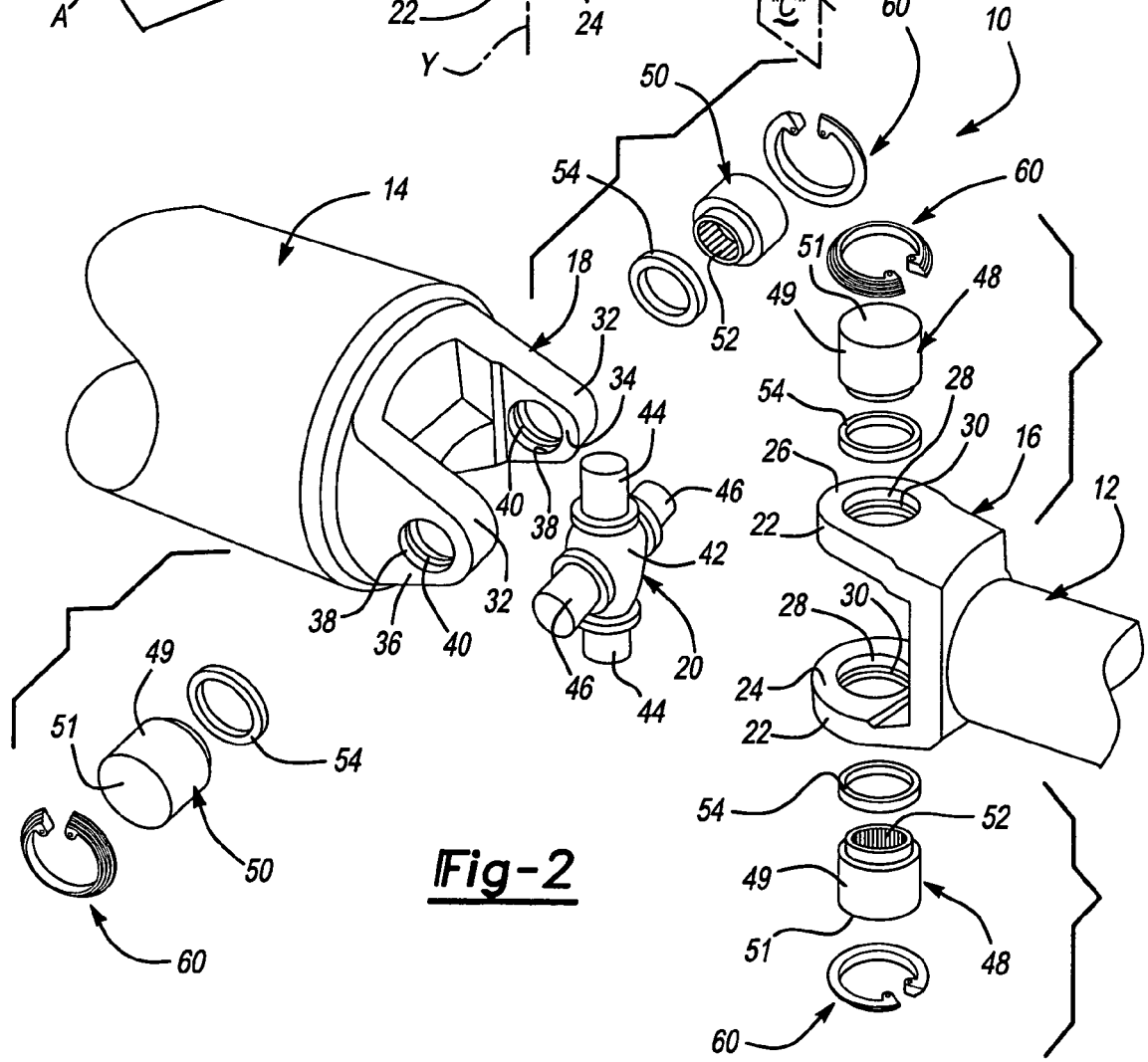
FIG. 2 is an exploded perspective view of the universal joint shown in FIG. 1.

Referring to FIGS. 1 and 2, a universal joint 10 is shown connecting a first shaft 12 to a second shaft 14. In general, universal joint 10 includes a first yoke 16 attached to an end of first shaft 12, a second yoke 18 attached to an end of second shaft 14 and a cruciform 20 interconnecting first yoke 16 to second yoke 18. The first yoke 16 is bifurcated and includes a pair of laterally spaced-apart legs 22 which are preferably symmetrical with respect to the rotary axis of first shaft 12, as denoted by construction line A. Legs 22 include an inboard surface 24 and an outboard surface 26 with an aperture 28 extending therebetween. Apertures 28 are aligned on a first trunnion axis, as denoted by construction line Y, which passes through and is orthogonal with respect to rotary axis A of first shaft 12. Each aperture 28 is a throughbore and includes an annular ring groove 30 positioned between the inboard surface 24 and the outboard surface 26.

Second yoke 18 is bifurcated and includes a pair of laterally-spaced legs 32 which are preferably symmetrical with respect to the rotary axis of second shaft 14, as denoted by construction line B. Legs 32 include an inboard surface 34 and an outboard surface 36 with an aperture 38 extending therebetween. Apertures 38 are aligned on a second trunnion axis, as denoted by construction line Z, which passes through and is orthogonal with respect to rotary axis B of second shaft 14. Apertures 38 are throughbores which include an annular groove 40 formed between the inboard surface 34 and the outboard surface 36. It should be noted that the shape and dimensions of apertures 28 and 38 may either be identical or different depending on the particular dimensions of cruciform 20 used therewith. It should also be noted that the annular ring grooves 30 and 40 may be formed by machining, casting or by similar technique.

As best seen in FIG. 2, cruciform 20 includes a central hub 42 from which a pair of first trunnions 44 and a pair of second trunnions 46 extend. First trunnions 44 are orthogonal with respect to second trunnions 46. First trunnions 44 are adapted for insertion into apertures 28 in legs 22 of first yoke 16 so as to be axially aligned on first trunnion axis Y. Similarly, second trunnions 46 are adapted to be inserted into apertures 38 in legs 32 of second yoke 18 so as to be axially aligned on second trunnion axis Z. With first trunnions 44 and second trunnions 46 installed in first and second yokes 16 and 18, respectfully, trunnion axes Y and Z pass through a common plane which orthogonally intersects the rotary axis of cruciform 20, shown in FIG. 1 by construction plane C.

Universal joint 10 also includes a first pair of bearing cups 48 adapted to be mounted in apertures 28 and a second pair of bearing cups 50 adapted to be mounted in apertures 38. First bearing cups 48 are provided for receiving and rotatably supporting first trunnions 44 in apertures 28. Similarly, second bearing cups 50 are provided for receiving and rotatably supporting second trunnions 46 in apertures 38. As seen, bearing cups 48 and 50 each include a tubular sleeve segment 49 enclosed by an end segment 51. A roller bearing assembly 52 is mounted in the sleeve segment for rotatably supporting trunnions 44 and 46 therein. In addition, annular elastomeric seals 54 are mounted on trunnions 44 and 46, respectively, for providing a sealed relationship with respect to the open end of the sleeve segments 49 of bearing cups 48 and 50, respectively.

Figure 3:
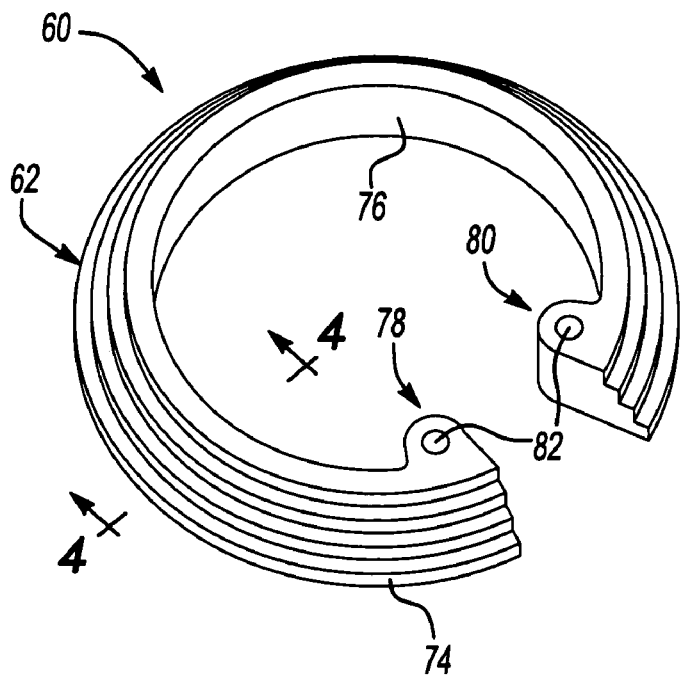
FIG. 3 is a perspective view of the retention member according to the principals of the present invention.

To assemble the universal joint 10, one of the bearing cups 48 is mounted on one of the first trunnions 44 prior to insertion thereof into its corresponding aperture 28 such that the terminal end surface of the trunnion is placed in abutting engagement with the end segment 51 of its corresponding bearing cup. Alternatively, trunnions 44 and 46 may be installed into corresponding apertures 28 and 38 with bearing cups 48 and 50 thereafter installed into apertures 28 and 38. For purposes of describing the cruciform alignment and retention device used in association with yokes 16 and 18, reference is now directed to FIGS. 3, 4 and 5. However, while the following disclosure is specifically directed to retention of cruciform 20 relative to first yoke 16, it is to be understood that a similar process is contemplated for use with second yoke 18.

Once rotary axis A of first shaft 12 is co-axially aligned with rotary axis B of second shaft 14, a retention member 60 cooperates with each bearing cup 48 to retain the aforementioned components in relation to each other. In reference to FIGS. 3 and 4, retention member 60 includes a C-shaped ring 62 having a bottom surface 64, a series of stepped surfaces or lands 66, 68 and 70, and a top surface 72. Surfaces 64, 66, 68, 70 and 72 are positioned substantially parallel to one another. Retention member 60 includes substantially cylindrically-shaped radially offset walls 74, 75, 77 and 79. Radially offset wall 74 extends between bottom surface 64 and land 66. Radially offset wall 75 extends between land 66 and land 68. Radially offset wall 77 extends between land 68 and land 70. Radially offset wall 79 extends between land 70 and top surface 72. Because ring 62 is C-shaped, each of radially offset walls 74, 75, 77 and 79 circumferentially extends less than 360 degrees. As further shown in FIG. 3, each of surfaces 64, 66, 68, 70 and 72 are interrupted annular surfaces circumferentially extending less than 360 degrees.

Figure 4:
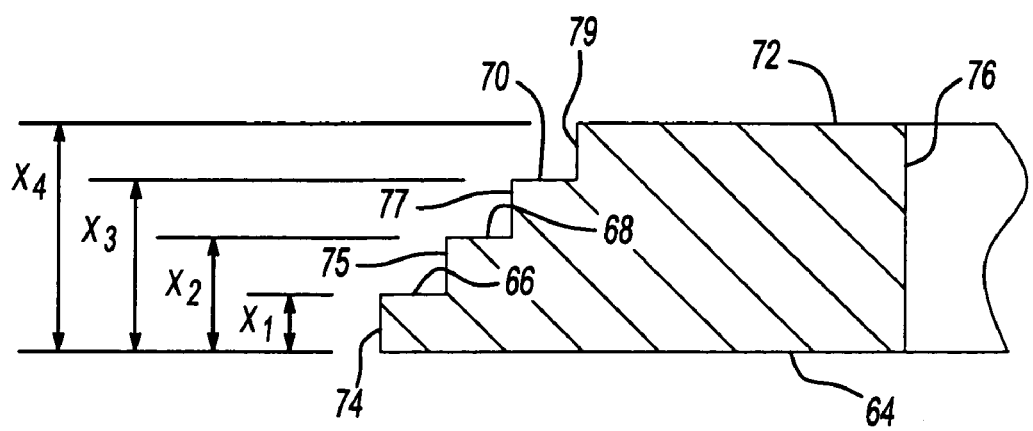
FIG. 4 is a sectional view of the retention member shown in FIG. 3.

A first thickness $X_1$ is defined by the distance between surfaces 64 and 66. A second thickness $X_2$ is defined by the distance between surfaces 64 and 68. A third thickness $X_3$ is defined as the distance between surfaces 64 and 70. A fourth or overall thickness $X_4$ is defined by the distance between surfaces 64 and 72. Retention member 60 is shown having an exemplary number of stepped surfaces 66–70, however, it should be appreciated the retention member may include any number of surfaces selectively insertable within a gap defined by bearing cup 48 and ring groove 30 without departing from the scope of the present invention. As best shown in FIG. 4, thicknesses $X_1$–$X_4$ increase in a direction from an outer edge 74 toward an inner edge 76 of retention member 60. Ring 62 terminates at first and second ends 78 and 80, respectively, and includes apertures 82 extending therethrough to facilitate installation of retention member 60 as described in greater detail hereinafter. In order to provide resistance to permanent deformation during operation, the retention member 60 is preferably constructed from a resilient material such as spring steel.

Figure 5:
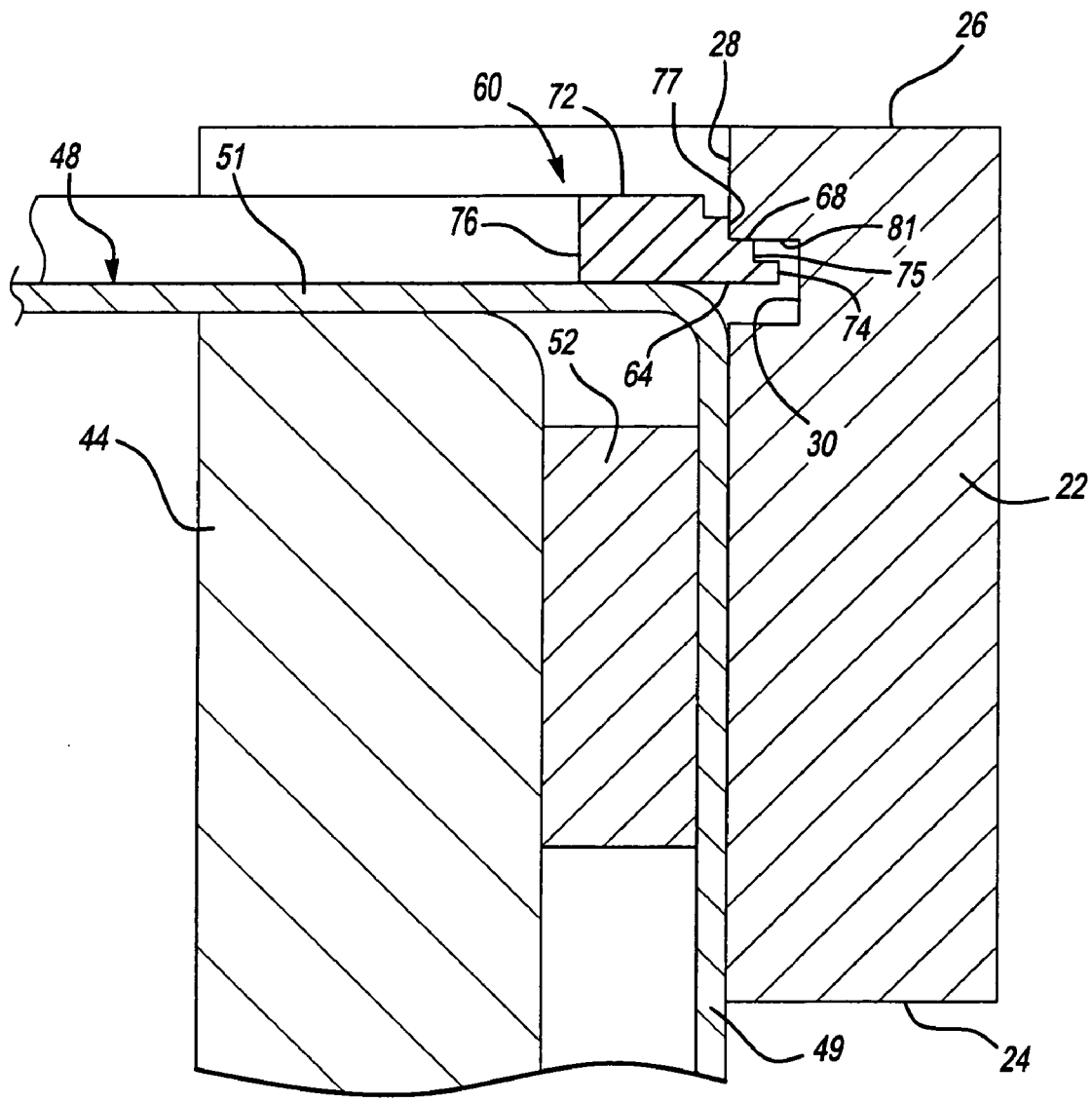
FIG. 5 is a partial sectional view of one of the yokes associated with the universal joint shown in FIGS. 1 and 2.

Referring to FIG. 5, universal joint 10 of the present invention is presented in an assembled state. Preferably, retention member 60 is installed by reducing the outer diameter of ring 62 with a tool (not shown) acting in cooperation with apertures 82 and disposing retention member 60 within aperture 28. Retention member 60 is inserted within the aperture 28 until bottom surface 64 contacts end segment 51 of bearing cup 48. After retention member 60 is positioned adjacent ring groove 30, the tool is released and ring 62 expands into ring groove 30. One of radially offset walls 75, 77 or 79 engages a portion of aperture 28 adjacent groove 30. In the embodiment depicted in FIG. 5, radially offset wall 77 engages a portion of aperture 28. Radially offset wall 74 is positioned within groove 30. Land 68 engages a lip 81 defined by groove 30. One skilled in the art will appreciate that the number of stepped surfaces positioned within groove 30 is merely exemplary and corresponds to the "stack-up" or summation of component tolerances described earlier. Care is taken to assure that the overall thickness of retention member 60 is great enough to account for component variation. Furthermore, the joint is designed and toleranced to ensure that at least one stepped surface may enter ring groove 30 to retain bearing cup 48.

Therefore, it should be appreciated that the configuration and operation of universal joint 10 provides both manufacturing and functional advantages over the prior art. Specifically, the universal joint 10 of the present invention utilizes a retention member to minimize component count, thereby easing assembly and reducing the cost of manufacture.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A driveshaft assembly comprising:
   a first shaft rotatable about a first axis of rotation and including a yoke with a pair of spaced apart legs each having a throughbore with an annular groove;
   a second shaft rotatable about a second axis of rotation; and
   a universal joint rotatably interconnecting said first shaft and said second shaft, wherein said universal joint includes a bearing cup and a retainer, said retainer being operable to engage said bearing cup and maintain a predetermined position of said universal joint relative to said first and second axes of rotation, said retainer including first and second radially offset walls adapted to engage said first shaft, said retainer being radially retractable from an undeformed state to a deformed state having a reduced outer diameter, said retainer being resiliently operable such that one of said first and second walls engage a portion of said throughbore adjacent to said annular groove.

2. The driveshaft assembly of claim 1 wherein said retainer includes a third wall radially offset from said first and second walls, said third wall being positioned within said annular groove.

3. The driveshaft assembly of claim 1 wherein said first and second walls are substantially cylindrically shaped and circumferentially extend less than 360 degrees.

4. The driveshaft assembly of claim 3 wherein said retainer includes a land radially extending between said first and second walls.

5. The driveshaft assembly of claim 4 wherein said land is operable to engage said first shaft.

6. A driveshaft assembly comprising:
   a first shaft adapted to be rotated about a first rotary axis, said first shaft including a first yoke having a pair of first legs, each first leg having a first throughbore and a first lip adjacent said first throughbore;
   a second shaft adapted to be rotated about a second rotary axis, said second shaft including a second yoke having a pair of second legs, each second leg having a second throughbore and a second lip adjacent said second throughbore;
   a cruciform having a pair of first trunnions and a pair of second trunnions;
   a pair of first bearing cups mounted on said first trunnions and positioned in said first throughbores;
   a pair of second bearing cups mounted on said second trunnions and positioned in said second throughbores; and
   retention members each shaped as an elastically radially deformable split ring and including a first land and a second land wherein each of said first land and said second land are adapted to engage one of said first and second lips and wherein said first and second lands include interrupted annular surfaces axially spaced apart from one another.

7. The driveshaft assembly of claim 6 wherein said first and second lands are substantially planar surfaces positioned substantially parallel to one another.

8. The driveshaft assembly joint of claim 7 wherein each of said retention members includes a substantially planar bottom surface engaging one of said first and second bearing cups.

9. The driveshaft assembly of claim 8 wherein each of said retention members includes a substantially cylindrical surface extending between said first land and said second land.

10. The driveshaft assembly of claim 6 wherein each of said retention members includes a third land spaced apart from and substantially parallel to said first and second lands, said third land being adapted to engage one of said first and second lips.

11. A driveshaft assembly comprising:
    a first shaft rotatable about a first axis of rotation and including a yoke having a pair of spaced apart legs, each leg having a throughbore with an annular groove;
    a second shaft rotatable about a second axis of rotation;
    a universal joint rotatably interconnecting said first shaft and said second shaft; and
    a retainer operable to maintain a predetermined position of said universal joint relative to said first and second axes of rotation, said retainer including first and second radially offset walls that are substantially cylindrically shaped and circumferentially extend less than 360 degrees, and wherein said retainer is radially retractable from an undeformed state to a deformed state having a reduced outer diameter for permitting one of said first and second walls to engage a portion of said throughbore adjacent to said annular groove.

12. The driveshaft assembly of claim 11 wherein said retainer includes a third wall radially offset from said first and second walls, said third wall being positioned within said annular groove.

13. The driveshaft assembly of claim 11 wherein said retainer includes a land radially extending between said first and second walls.

14. The driveshaft assembly of claim 13 wherein said land is operable to engage said first shaft.

* * * * *